(12) United States Patent
Hazel et al.

(10) Patent No.: US 7,407,718 B2
(45) Date of Patent: Aug. 5, 2008

(54) THERMAL/ENVIRONMENTAL BARRIER COATING SYSTEM FOR SILICON-CONTAINING MATERIALS

(75) Inventors: Brian Thomas Hazel, Cincinnati, OH (US); Irene Spitsberg, Loveland, OH (US); Christine Govern, Cincinnati, OH (US); Bangalore Aswatha Nagaraj, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/160,185

(22) Filed: Jun. 13, 2005

(65) Prior Publication Data

US 2006/0280962 A1 Dec. 14, 2006

(51) Int. Cl.
*B32B 9/00* (2006.01)

(52) U.S. Cl. .................. 428/701; 428/469; 428/699; 428/702; 416/241 B

(58) Field of Classification Search .......... 428/699, 428/697, 701, 702; 416/241 B
See application file for complete search history.

(56) References Cited

U.S. PATENT DOCUMENTS 6,733,908 B1 * 5/2004 Lee et al. ............... 428/702
6,759,151 B1 * 7/2004 Lee ............................ 428/701
7,115,326 B2 * 10/2006 Spitsberg et al. ........... 428/697
2005/0013994 A1 * 1/2005 Strangman ................. 428/336

* cited by examiner

Primary Examiner—Timothy M Speer
(74) Attorney, Agent, or Firm—William Scott Andes; Gary M. Hartman; Domenica N. S. Hartman

(57) ABSTRACT

A coating system for Si-containing materials, particularly Si-based composites used to produce articles exposed to high temperatures. The coating system is a compositionally-graded thermal/environmental barrier coating (T/EBC) system that includes an intermediate layer containing yttria-stabilized hafnia (YSHf) and mullite, alumina and/or an aluminosilicate, which is used in combination with an inner layer between a Si-containing substrate and the intermediate layer and a thermal-insulating top coat overlying the intermediate layer. The intermediate layer provides environmental protection to the silicon-containing substrate, and has a coefficient of thermal expansion between that of the top coat and that of the inner layer so as to serve as a transition layer therebetween. The intermediate layer is particular well suited for use in combination with an inner layer of an alkaline earth metal aluminosilicate (such as BSAS) and a top coat formed of YSZ or YSHf.

20 Claims, 1 Drawing Sheet

THERMAL/ENVIRONMENTAL BARRIER COATING SYSTEM FOR SILICON-CONTAINING MATERIALS

STATEMENT REGARDING FEDERALLY SPONSORED RESEARCH

This invention was made with Government support under N00421-00-3-0536 awarded by the U.S. Department of the Navy. The Government has certain rights in the invention.

BACKGROUND OF THE INVENTION

This invention relates to coating systems suitable for protecting components exposed to high-temperature environments, such as the hot gas flow path through a gas turbine engine. More particularly, this invention is directed to a coating system that exhibits improved high temperature stability when used to protect a silicon-containing substrate.

Higher operating temperatures for gas turbine engines are continuously sought in order to increase their efficiency. While nickel, cobalt and iron-base superalloys have found wide use for components throughout gas turbine engines, alternative materials have been proposed. In particular, silicon-based non-oxide ceramics, most notably with silicon carbide (SiC) and silicon nitride ($Si_3N_4$) as a matrix and/or reinforcing material, are candidates for high temperature applications, such as combustor liners, vanes, shrouds, airfoils, and other hot section components of gas turbine engines. However, when exposed to water-containing high temperatures such as that of a gas turbine engine, components formed of Si-based ceramics lose mass and recede because of the formation of volatile silicon hydroxide ($Si(OH)_4$). The recession rate due to volatilization or corrosion is sufficiently high in a gas turbine engine environment to require an environmentally protective coating, commonly referred to as an environmental barrier coating (EBC).

Critical requirements for an EBC intended to protect gas turbine engine components formed of a Si-based material include stability, low thermal conductivity, a coefficient of thermal expansion (CTE) compatible with the Si-based ceramic material, low permeability to oxidants, and chemical compatibility with the Si-based material and a silica scale that forms from oxidation. Silicates, and particularly barium-strontium-aluminosilicates (BSAS; $(Ba_{1-x}Sr_x)O$—$Al_2O_3$—$SiO_2$) and other alkaline earth metal aluminosilicates, have been proposed as EBC's in view of their environmental protection properties and low thermal conductivity. For example, U.S. Pat. Nos. 6,254,935, 6,352,790, 6,365,288, 6,387,456, and 6,410,148 to Eaton et al. disclose the use of BSAS and alkaline earth metal aluminosilicates as outer protective coatings for Si-based substrates, with stoichiometric BSAS (molar ratio: $0.75BaO.0.25SrO.Al_2O_3.2SiO_2$; molar percent: $18.75BaO.6.25SrO.25Al_2O_3.50\ SiO_2$) generally being the preferred alkaline earth metal aluminosilicate composition. The use of rare earth silicates in EBC's has also been proposed, as taught in U.S. Pat. No. 6,759,151 to Lee. Layers of silicon, mullite ($3Al_2O_3.2SiO_2$), and mixtures of mullite and BSAS have been proposed as bond coats to promote adhesion and limit reactions between an EBC and an underlying Si-based substrate. If the particular component will be subjected to surface temperatures in excess of about 2500° F. (about 1370° C.), an EBC can be cooled with backside cooling of the substrate and thermally protected with an overlying thermal barrier coating (TBC) in accordance with commonly-assigned U.S. Pat. No. 5,985,470 to Spitsberg et al. In combination, these layers form what has been referred to as a thermal/environmental barrier coating (T/EBC) system.

The most commonly used TBC material for gas turbine applications is yttria-stabilized zirconia (YSZ). While exhibiting a desirable combination of properties, including low thermal conductivity, stability, good mechanical properties, and wear resistance, YSZ has a CTE mismatch with BSAS (a CTE of about 8.9-10.6 ppm/° C. for YSZ, compared to about 5.3 ppm/° C. for stoichiometric BSAS). YSZ also reacts with BSAS at temperatures greater than about 2500° F. (about 1370° C.), leading to sintering of the YSZ and a consequent loss in thermal and mechanical properties, resulting in through-thickness and horizontal cracking. To abate these problems, transition layers have been proposed containing mixtures of YSZ and alumina, mullite, and/or alkaline earth metal aluminosilicate, as taught in commonly-assigned U.S. Pat. No. 6,444,335 to Wang et al.

While T/EBC systems as described above have significantly advanced the capability of using Si-based ceramic materials for high temperature components, further improvements in chemical stability, thermal expansion match, and sintering resistance would be desirable.

BRIEF SUMMARY OF THE INVENTION

The present invention generally provides a coating system for Si-containing material, particularly those for articles exposed to high temperatures, including the hostile thermal environment of a gas turbine engine. Examples of such materials include those with a dispersion of silicon carbide, silicon carbide and/or silicon particles as a reinforcement material in a metallic or nonmetallic matrix, as well as those having a silicon carbide, silicon nitride and/or silicon-containing matrix, and particularly composite materials that employ silicon carbide, silicon nitride and/or silicon as both the reinforcement and matrix materials (e.g., SiC/SiC ceramic matrix composites (CMC)).

The invention is a compositionally-graded thermal/environmental barrier coating (T/EBC) system that exhibits improved mechanical integrity for high application temperatures that necessitate thick protective coatings. The T/EBC system includes an intermediate layer containing yttria-stabilized hafnia (YSHf) and mullite, alumina, and/or an aluminosilicate, such as a rare earth metal aluminosilicate and/or an alkaline earth metal aluminosilicate. The intermediate layer is provided between a thermal-insulating top coat overlying the intermediate layer and an inner layer capable of providing environmental protection to a silicon-containing substrate. The intermediate layer preferably has a coefficient of thermal expansion between those of the top coat and inner layer, and as such operates as a transition layer therebetween.

The intermediate layer is particular well suited for use in combination with an inner layer of an aluminosilicate (including rare earth metal aluminosilicates and alkaline earth metal aluminosilicates such as BSAS) and a top coat formed of YSZ and/or YSHf, alone or with additions of one or more rare earth oxides capable of reducing the CTE of the top coat. According to a preferred aspect of the invention, a coating system deposited on a hot section component of a gas turbine engine and comprising a YSHf transition layer between a BSAS layer and a top coat containing YSZ or YSHf has been shown to have better resistance to chemical interaction with BSAS, higher temperature capability, and reduce sintering of the top coat. YSHf also has a lower CTE than YSZ, and provides a good CTE match for BSAS-containing coatings thermally protected by a YSZ or YSHf top coat. As such, a T/EBC as described above is believed to be capable of reliably providing both thermal and environmental protection to a Si-containing substrate at temperatures in excess of 2500° F. (1370° C.) as a result of exhibiting improved mechanical integrity as compared to prior art coating systems for Si-containing materials.

Other objects and advantages of this invention will be better appreciated from the following detailed description.

DETAILED DESCRIPTION OF THE INVENTION

Figure 1:
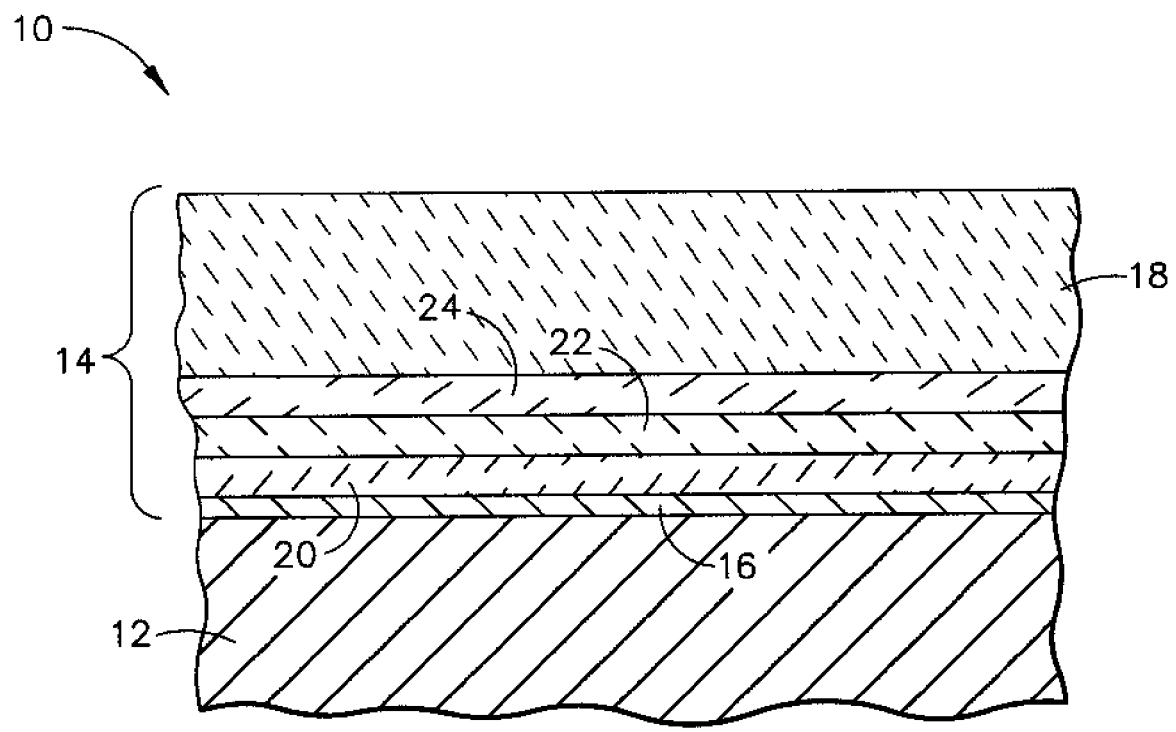
FIG. 1 schematically represents a cross-sectional view of a gas turbine engine component formed of a Si-containing material and having a thermal/environmental barrier coating system in accordance with this invention.

The present invention is generally applicable to components that operate within environments characterized by relatively high temperatures, and are therefore subjected to severe thermal cycling and stresses, oxidation, and corrosion. Notable examples of such components include combustor components, high pressure turbine vanes, and other components within the hot gas flow path of gas turbine engines. A surface region 12 of a hot section component 10 is represented in FIG. 1 for purposes of illustrating the invention. The component 10, or at least the surface region 12 of the component 10, is formed of a silicon-containing material, such as a metal silicide alloy (e.g. niobium and molybdenum silicide) or a metal matrix composite reinforced with silicon carbide, silicon nitride, and/or silicon, a composite having a matrix of silicon carbide, silicon nitride, and/or silicon, or a composite with a silicon carbide, silicon nitride, and/or silicon matrix reinforced with silicon carbide, silicon nitride and/or silicon. However, the invention is generally applicable to other materials containing silicon in any form.

As shown in FIG. 1, the surface region 12 of the component 10 is protected by a multilayer T/EBC system 14 that includes a thermal-insulating top coat 18. The coating system 14 provides environmental protection to the underlying surface region 12 as well as reduces the operating temperature of the component 10 and interior layers 16, 20, 22, and 24 of the coating system 14, thereby enabling the component 10 to survive within higher temperature environments than otherwise possible. Preferred materials for the top coat 18 include YSZ and YSHf, alone or with additions of rare earth oxides capable of reducing the CTE and increasing the stability and sintering resistance of the top coat 18. Preferred compositions for YSZ and YSHf contain about 3 to about 4 molar percent yttria and about 1 to about 40 molar percent yttria, respectively. Alternative materials for the top coat 18 include other ceramic materials known and proposed in the art for thermal barrier coatings. A suitable thickness range for the top coat 18 is about 25 to about 500 micrometers, with a preferred range of about 75 to about 250 micrometers, depending on the particular application.

The major mechanism for degradation of silicon carbide (as well as silicon and other silicon compounds) in a corrosive environment is the formation of volatile silicon hydroxide ($Si(OH)_4$) products. Because the diffusivity of oxidants in materials typically suitable for use as the top coat 18 is generally very high, the coating system 14 includes an environmental barrier coating (EBC) 22 that, individually and preferably in combination with the other interior layers 16, 20, and 24, exhibits low diffusivity to oxidants, e.g., oxygen and water vapor, to inhibit oxidation of the silicon within the surface region 12. Preferably, the EBC 22 is also sufficiently chemically and physically compatible with the surface region 12 to remain adherent to the region 12 under severe thermal conditions.

Suitable materials for the EBC 22 include aluminosilicates, such as rare earth metal aluminosilicates in accordance with the teachings of U.S. Pat. No. 6,759,151 to Lee and alkaline earth metal aluminosilicates such as BSAS in accordance with the teachings of U.S. Pat. Nos. 6,254,935, 6,352, 790, 6,365,288, 6,387,456, and 6,410,148 to Eaton et al., the relevant contents of which are incorporated herein by reference. BSAS and particularly stoichiometric BSAS as the EBC 22 provides excellent environmental protection for the Si-containing surface region 12 as well as the underlying layers 16 and 20, as discussed below. As a result, a BSAS EBC 22 is able to inhibit the growth of an interfacial silica layer at the surface region 12 when the component 10 is exposed to the oxidizing environment of a gas turbine engine. In addition, BSAS exhibits good thermal barrier properties due to its low thermal conductivity, is physically compliant with a SiC-containing substrate such as the surface region 12, and is relatively compatible with the Si-containing surface region 12 in terms of CTE. A suitable thickness range for the EBC 22 is about 25 to about 500 micrometers, depending on the particular application.

The innermost layers 16 and 20 of the coating system 14 serve as bond coats to adhere the EBC 22 (and, therefore, the remaining layers 24 and 18) to the surface region 12, while the layer 24 serves as a transition layer between the EBC 22 and the top coat 18. Preferred compositions for the innermost layers 16 and 20 are silicon and mullite, respectively. In accordance with commonly-assigned U.S. Pat. No. 6,299,988 to Wang et al., the inclusion of the silicon layer 16 is useful to improve oxidation resistance of the surface region 12 and enhances bonding of the other layers 22, 24, and 18 to the surface region 12 if the surface region contains SiC or silicon nitride. A suitable thickness for the silicon layer is about 12 to about 250 micrometers. The mullite-containing layer 20 also promotes adhesion of the other layers 18, 22, and 24 to the Si-containing surface region 12, while also preventing interactions at high temperatures between the Si-containing surface region 12 and the EBC 22, particularly if the EBC 22 is formed of BSAS. Mullite is particularly suitable as the material for the layer 20 of the coating system 14 because of its chemical stability with Si-containing materials at high temperatures. Though the mullite-containing layer 20 can exhibit significant silica activity and volatilization if exposed to water vapor at high temperatures, the EBC 22 advantageously provides the required environmental protection to avoid or at least substantially inhibit these adverse reactions. The layer 20 may also contain BSAS for less demanding applications, e.g., temperatures below about 1300° C. The addition of BSAS to the layer 20 is also relatively compatible with the Si-containing surface region 12 in terms of having a CTE of about 5.3 ppm/° C., as compared to a CTE of about 4.9 ppm/° C. for SiC/SiC CMC. A suitable thickness range for the mullite-containing layer 20 is about 12 to about 250 micrometers, depending on the particular application.

According to the invention, the transition layer 24 separating the top coat 18 and EBC 22 is formed of a YSHf-containing material combined with mullite, alumina, and/or an aluminosilicate, the latter of which includes rare earth metal aluminosilicates and alkaline earth metal aluminosilicates such as BSAS. Suitable YSHF compositions contain about 1 to about 40 molar percent yttria with the balance essentially hafnia. The yttria content of the YSHf composition may be partially replaced with rare earth oxides capable of stabilizing hafnia. As compared to YSZ, the YSHf content of the transition layer 24 offers better resistance to chemical interaction with any BSAS within the EBC 22, higher temperature capability, and reduced sintering of the top coat 18. YSHf also has sufficiently low thermal conductivity such that, if the top coat 18 were to spall, the transition layer 24 could continue to provide a level of thermal protection to the EBC 22 and Si-containing surface region 12. As such, the transition layer 24 of this invention is believed to promote the ability of the T/EBC system 14 to thermally and environmentally protect the Si-containing surface region 12 over numerous thermal cycles and at elevated temperatures. Advantages of using mullite, alumina, or a mixture of these with YSHf in the layer 24 include their higher temperature capability as compared to BSAS. Because BSAS exhibits low silica activity and low diffusivity to oxidants, a YSHf-containing transition layer 24 that also contains BSAS is able to serve as an environmental barrier to the underlying surface region 12. Simultaneously, additions of BSAS to the transition layer 24 render it more compatible with a BSAS-containing EBC 22 in terms of CTE.

YSHf constitutes at least 20 up to 80 volume percent of the transition layer 24, and more preferably about 40 to about 60 volume percent of the transition layer 24. The YSHf-containing transition layer 24 can be a substantially homogeneous mixture of YSHf and mullite, alumina, and/or aluminosilicate. Alternatively, the transition layer 24 can be made up of discrete sublayers, each with a different composition. For example, the composition of a sublayer contacting the EBC 22 would preferably consist essentially of aluminosilicate, mullite and/or alumina, while an outermost sublayer contacting the top coat 18 would preferably consist essentially of YSHf, with one or more intermediate sublayers preferably present and having compositions that are intermediate those of the inner and outer sublayers. According to another alternative, the transition layer 24 can have a continuously changing composition, from essentially all aluminosilicate, mullite and/or alumina adjacent the EBC 22 to essentially all YSHf adjacent the top coat 18. In this embodiment, the transition layer 24 has a decreasing concentration of aluminosilicate, mullite and/or alumina and an increasing concentration of YSHf in a direction away from the EBC 22. In combination, the higher concentration of aluminosilicate, mullite and/or alumina adjacent the EBC 22 and the higher concentration of YSHf adjacent the top coat 18 serve to provide a gradually increasing CTE, with a minimum CTE adjacent the EBC 22 and a maximum CTE adjacent the top coat 18.

A suitable thickness for the transition layer 24 is up to about 500 micrometers, depending on the particular application and the thickness of the other layers 16, 18, 20, and 22 of the T/EBC system 14. High application temperatures, e.g., up to 1700° C., necessitate thick protective coating systems, generally on the order of 250 micrometers or more. It is with such coating systems that the benefits of the YSHf-containing transition layer 24 become more necessary to improve the mechanical integrity of the coating system 14.

As with prior art bond coats and environmental coatings, the layers 16, 20, 22, and 24 of the coating system 14 can be individually deposited by air and vacuum plasma spraying (APS and VPS, respectively), though it is foreseeable that deposition could be performed by other known techniques, such as chemical vapor deposition (CVD) and high velocity oxy-fuel (HVOF). The top coat 18 can also be deposited by known techniques, including plasma spraying and physical vapor deposition (PVD) techniques. Thereafter, a heat treatment may be performed after deposition of the individual layers 16, 20, 22, and 24 and/or top coat 18 to relieve residual stresses created during cooling from elevated deposition temperatures.

While our invention has been described in terms of a preferred embodiment, it is apparent that other forms could be adopted by one skilled in the art. Accordingly, the scope of our invention is to be limited only by the following claims.

What is claimed is:

1. A coating system on an article having a substrate formed of a silicon-containing material, the coating system comprising:
   an inner layer overlying the substrate and containing an alkaline earth metal aluminosilicate;
   an intermediate layer overlying the inner layer, the intermediate layer consisting essentially of an yttria-stabilized hafnia and at least one material selected from the group consisting of mullite, alumina, and aluminosilicates; and
   a top coat overlying the intermediate layer and formed of a thermal-insulating material that contains yttria and is chemically reactive with the alkaline earth metal aluminosilicate in the inner layer at temperatures above about 1370° C.;
   wherein the intermediate layer contacts the inner layer and the top coat, has better resistance to chemical interaction with the alkaline earth metal aluminosilicate in the inner layer than the thermal-insulating material, and has a coefficient of thermal expansion between that of the thermal-insulating material and that of the inner layer.

2. A coating system according to claim 1, wherein the substrate is formed of a material selected from the group consisting of metal silicide alloys, metal matrix composites reinforced with silicon carbide, silicon nitride, and/or silicon, composites having a matrix of silicon carbide, silicon nitride, and/or silicon, and composites with a silicon carbide, silicon nitride, and/or silicon matrix reinforced with silicon carbide, silicon nitride, and/or silicon.

3. A coating system according to claim 1, wherein the inner layer consists essentially of the alkaline earth metal aluminosilicate.

4. A coating system according to claim 1, wherein the inner layer consists essentially of the alkaline earth metal aluminosilicate and the alkaline earth metal aluminosilicate is barium strontium aluminosilicate.

5. A coating system according to claim 1, further comprising at least one bond coat layer between the substrate and the inner layer.

6. A coating system according to claim 5, wherein the at least one bond coat layer is formed of mullite or a mixture of mullite and barium strontium aluminosilicate.

7. A coating system according to claim 1, wherein the top coat consists essentially of yttria-stabilized zirconia, or yttria-stabilized hafnia, or yttria-stabilized zirconia with additions of one or m ore rare earth oxides, or yttria-stabilized hafnia with additions of one or more rare earth oxides.

8. A coating system according to claim 1, wherein the aluminosilicate of the intermediate layer is chosen from the group consisting of rare earth metal aluminosilicates and alkaline earth metal aluminosilicates.

9. A coating system according to claim 1, wherein the yttria-stabilized hafnia of the intermediate layer contains about 1 to about 40 molar percent yttria and optionally rare earth oxides, the balance essentially hafnia.

10. A coating system according to claim 1, wherein the intermediate layer has a substantially uniform composition of yttria-stabilized hafnia and the at least one material.

11. A coating system according to claim 1, wherein the intermediate layer is compositionally graded.

12. A coating system according to claim 1, wherein the intermediate layer consists of yttria-stabilized hafnia and mullite.

13. A coating system according to claim 12, wherein the inner layer consists essentially of barium strontium aluminosilicate and the top coat consists essentially of yttria-stabilized hafnia.

14. A coating system according to claim 1, wherein the article is a component of a gas turbine engine.

15. A gas turbine engine component comprising:
a substrate formed of a silicon-containing material;
at least one bond coat on the substrate;
an environmental barrier coating on the at least one bond coat, the environmental barrier coating containing an alkaline earth metal aluminosilicate;
a transition layer on the environmental barrier coating, the transition layer consisting essentially of yttria-stabilized hafnia and at least one material selected from the group consisting of mullite, alumina, rare earth metal aluminosilicates, and alkaline earth metal aluminosilicates; and
a thermal barrier coating on the transition layer, the thermal barrier coating being formed by a thermal-insulating material that contains yttria-stabilized hafnia and/or yttria-stabilized zirconia and is chemically reactive with the alkaline earth metal aluminosilicate of the environmental barrier coating at temperatures above about 1370° C.;
wherein the transition layer contacts the environmental barrier coating and the thermal barrier coating, has better resistance to chemical interaction with the alkaline earth metal aluminosilicate of the environmental barrier coating than the thermal-insulating material, and has a coefficient of thermal expansion between that of the thermal-insulating material and that of the environmental barrier coating.

16. A gas turbine engine component according to claim 15, wherein the environmental barrier coating consists essentially of the alkaline earth metal aluminosilicate and the alkaline earth metal aluminosilicate is barium strontium aluminosilicate.

17. A gas turbine engine component according to claim 15, wherein the at least one bond coat layer is formed of at least one of mullite, a mixture of mullite and barium strontium aluminosilicate, and silicon.

18. A gas turbine engine component according to claim 15, wherein the thermal barrier coating consists essentially of yttria-stabilized hafnia.

19. A gas turbine engine component according to claim 15, wherein the yttria-stabilized hafnia of the transition layer contains about 1 to about 40 molar percent yttria and optionally rare earth oxides, the balance essentially hafnia.

20. A gas turbine engine component according to claim 15, wherein the transition layer consists of yttria-stabilized hafnia and mullite.

* * * * *